Feb. 27, 1962 J. B. BIDWELL ET AL 3,022,850
SINGLE STICK MEMBER FOR CONTROLLING THE
OPERATION OF MOTOR VEHICLES
Filed April 11, 1958

INVENTORS
Joseph B. Bidwell &
BY Roy S. Cataldo

E. W. Christen
ATTORNEY

United States Patent Office 3,022,850
Patented Feb. 27, 1962

3,022,850
SINGLE STICK MEMBER FOR CONTROLLING THE OPERATION OF MOTOR VEHICLES
Joseph B. Bidwell and Roy S. Cataldo, Birmingham, Mich., assignors to General Motors Corporation, Detroit, Mich., a corporation of Delaware
Filed Apr. 11, 1958, Ser. No. 727,980
4 Claims. (Cl. 180—77)

The present invention relates to vehicles and, more particularly, to means for controlling the operation thereof.

At the present time a control system for an automotive vehicle normally includes a steering wheel for controlling the direction the vehicle is traveling, a separate control for regulating the engine and the speed of the vehicle and a separate control for actuating the brakes to stop the vehicle.

It is now proposed to provide an integrated control which includes means for simultaneously controlling the steering, acceleration and braking of the vehicle. More particularly, this is to be accomplished by providing a control member such as a stick which is normally in a vertical position but is free to move to the right or left thereof for steering the vehicle to the right or left respectively, and to move fore and aft thereof for accelerating and braking the vehicle. This control member includes a portion having sufficient mass to be responsive to any acceleration of the vehicle in the plane in which the vehicle is traveling. This acceleration of the mass will produce a force on the control member that will oppose the motion of the control member that initiated the acceleration of the vehicle. Thus in the event the operator moves the control to cause the vehicle to change its direction, the mass of the control will produce a force opposing this movement. Thus, in the event the wheels of the vehicle should skid on the surface of the road, if the operator releases the control member, the acceleration forces will tend to move the member so as to turn the wheels in the direction to reduce the skid. Thus the control member may be made to provide a suitable corrective action without over-correcting as frequently occurs when the operator manually moves the controls. Moreover, this force not only tends to stabilize the vehicle but will also be sensed by the operator to thereby produce a "feel" of the operating characteristics of the vehicle.

At the present time the steering systems have a substantially uniform rate of response to the input signal irrespective of the speed at which the vehicle is traveling, i.e., a constant steering ratio. In other words, if the operator displaces the steering control some predetermined amount, the dirigible road wheels will always be displaced a corresponding amount. As a result, as the speed of the vehicle increases a given displacement of the steering control will produce increasing lateral accelerations of the vehicle. In addition, as the speed of the vehicle increases the amount of displacement of the wheels required to steer the vehicle decreases. Thus a constant steering ratio necessitates an excessive amount of movement of the steering control at low speeds and inadequate control at the higher speeds.

It is now proposed to overcome these objections by providing a steering system which is responsive to the speed of the vehicle and will change its sensitivity with changes in the speed of the vehicle. More particularly, this is to be accomplished by providing a servo positioning system which interconnects a steering control with the dirigible wheels so that movement of the steering control will displace the dirigible wheels. In addition, a pickup is provided which is responsive to the vehicle speed and is effective to regulate the responsiveness of the servo control system in proportion thereto. Since the lateral acceleration of the vehicle varies as the square of the velocity of the vehicle, it is preferable for the sensitivity of the servo system to decrease as the reciprocal of the square of the speed. Under these circumstances it will be seen that a given displacement of the steering control member will produce a substantially constant lateral acceleration of the vehicle irrespective of the velocity of the vehicle.

Figure 1:
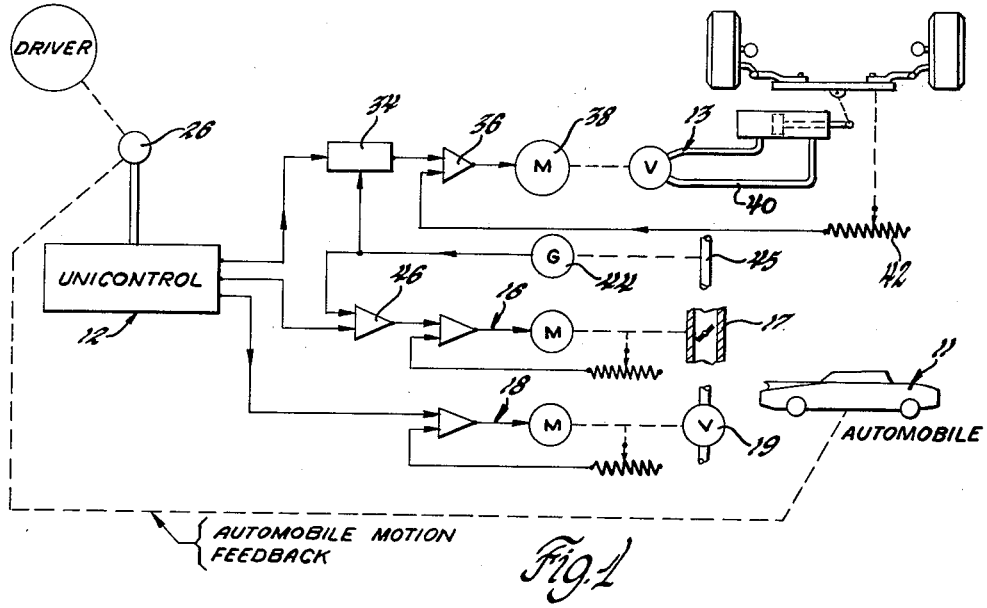
FIGURE 1 is a diagram of a vehicle control system embodying the present invention.
Figure 2:
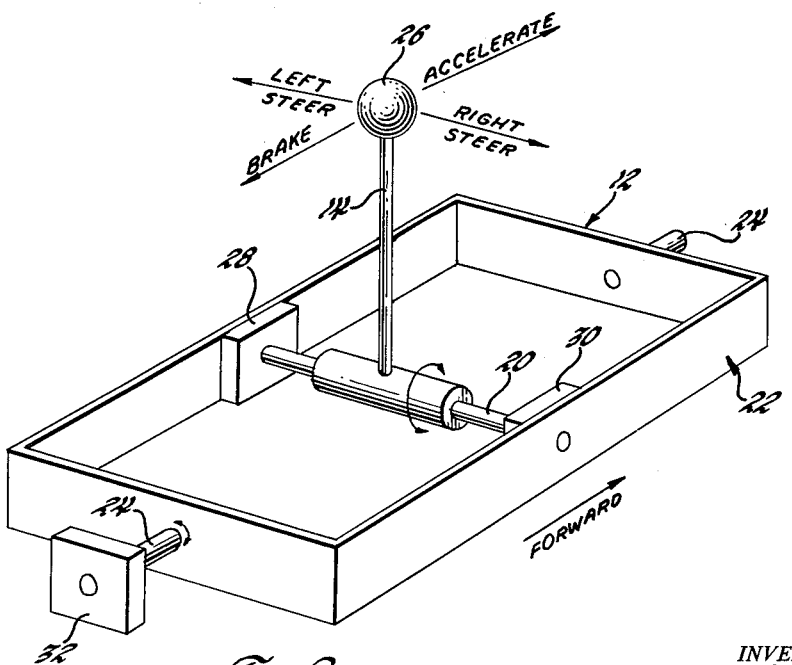
FIGURE 2 is a perspective view of the control member and the mounting therefor employed in the steering system of FIGURE 1.

Referring to the drawings in more detail, the present invention is adapted to be installed in a control system for an automotive vehicle 11. This system includes an integrated control 12 which is operatively interconnected with a steering servo system 13, a throttle servo system 16 and a brake servo system 18 which are effective to control the operation of the vehicle.

The present control 12 comprises a control rod 14 which is mounted on a shaft 20 carried by a gimbal ring 22. The control rod 14 and gimbal ring 22 are spring biased to retain the control rod 14 in a vertical position. The gimbal ring 22 is in turn carried by a pair of shafts 24 normal to the first shaft 20, thereby permitting the rod 14 to swing freely in any direction. In the present instance the shaft 20 carrying the rod 14 is disposed transverse of the vehicle and the ring 22 rotates about an axis extending longitudinally of the vehicle. The upper end of the rod 14 includes a mass 26 which may be shaped into a sphere so as to form a convenient handle for the operator to grasp. The shaft 20 which carries the control rod 14 has a pair of pickups provided thereon which are exclusively responsive to the movement of this shaft 20 relative to the gimbal ring 22. The present pickups are potentiometers 28 and 30, one of which is operatively connected to the throttle servo system 16 that operates the throttle valve 17 of the vehicle 11 and the other of which is operatively interconnected with the brake servo system 18 that operates a valve 19 in the brake system of the vehicle 11. When the control rod 14 is in a substantially vertical position, these pickups 28, 30 will be adjusted so that the throttle and brake systems will not be actuated. However, in the event the control rod 14 is moved forwardly from the vertical position, the potentiometer 28 will develop a signal effective to actuate the throttle servo 16 so as to progressively open the throttle valve 17 in the engine with the forward movement of the rod. During such movement the brakes will be inactive. Conversely, if the control rod 14 is moved toward the rear from the vertical position, the potentiometer 30 will produce a signal effective to cause the servo 18 to actuate the brakes with progressively increasing braking action as the rod 14 is moved further aft. During this period the throttle will remain in the idle position. It will be noted that the control rod 14 may be moved forwardly and rearwardly and cause rotation of the shaft 20 without in any way effecting the position of the gimbal ring 22.

The gimbal ring 22 is supported by a pair of stub shafts 24 extending longitudinally of the vehicle so as to permit the gimbal ring 22 to roll about a longitudinal axis. A pickup 32 is operatively interconnected with one of these shafts 24 so as to be exclusively responsive to movement of the gimbal ring 22 about this axis. This pickup is preferably a balanced potentiometer 32 having a movable center tap so that when the gimbal ring 22 is in a horizontal position, no signal will be provided. However, upon displacement of the control rod 14 and the gimbal ring 22 in one direction or the other, the potentiometer 32 will produce a positive or negative signal whose polarity will be dependent upon the direction of displacement and whose magnitude will be a function of the amount of displacement.

The center tap of this potentiometer 32 is interconnected with a variable gain amplifier 34. This amplifier 34 is conventional in form and may be of the type commonly used in automatic gain control circuits as shown on p. 365 of the textbook "Electronic and Radio Engineering," F. E. Terman, 4th ed., McGraw-Hill, 1955. The output of this amplifier 34 is in turn interconnected with a closed loop servo positioning system which includes a summing amplifier 36, a servo unit 38, the steering system 40 and a feedback pickup 42 responsive to the displacement of the dirigible wheels of the vehicle 11. The pickup 42 develops a signal proportional to movement of the wheels and feeds it into a second input in the summing amplifier 36. This pickup 42 is preferably interconnected with the pitman arm so as to develop a signal proportional to the displacement of the wheels without being subject to any lost motion in the steering system. The servo unit 38 actuates a power motor in the steering system 40 so as to cause the dirigible wheels to move in a direction corresponding to the polarity of the signal from the potentiometer 32. This movement will continue until the output of the wheel pickup 42, as fed into the summing amplifier 36, is equal to the output from the variable gain amplifier 34. When this occurs the output of the summing amplifier 36 will be zero and the displacement of the dirigible wheels will correspond to the displacement of the steering control rod 14. This summing amplifier 36 may be of conventional form such as shown on pp. 663–664 of the above mentioned textbook by F. E. Terman.

A pickup 44 may be provided which is responsive to the speed of the car. For example, the pickup may consist of a tachometer which is interconnected with the transmission output shaft 45 so as to develop a signal proportional to the speed of the vehicle. This signal is fed into the variable gain amplifier 34 to vary the gain thereof as a function of the speed of the vehicle. Although any desired relationship may be employed it has been found desirable for the gain of this amplifier 34 to vary as the reciprocal of the square of the speed. Since the lateral acceleration will vary as the square of the speed, varying the sensitivity or responsiveness of the steering servo system as the reciprocal of the square of the speed, any given displacement of the steering control rod 14 will produce a substantially constant lateral acceleration irrespective of the speed of the vehicle.

Any sharp turns of the vehicle will be made at relatively low speeds and as the speed of the vehicle increases, the amount of steering or displacement of the dirigible wheels required normally decreases. Thus, varying the steering ratio as a function of the speed will result in the normal steering maneuvers requiring a substantially constant amount of movement of the steering control rod 14 irrespective of the speed of the vehicle. This will eliminate the necessity of excessive steering efforts at lower speeds and will insure adequate control at higher speeds.

If desired, the signal proportional to the speed of the vehicle may be fed into a summing amplifier 46 in the throttle servo system so that the throttle valve will be positioned to match the control signal against the speed signal and thereby maintain a constant speed of the vehicle for any given position of the control rod 14.

The upper end of the control includes a heavy mass 26 which not only forms a handle but is also responsive to any acceleration of the vehicle. In the event the vehicle is turning in one direction or the other, the lateral acceleration will cause the mass 26 to develop a force that will tend to move the mass 26 and control rod 14 transversely toward the outside of the turn. This force will oppose the force exerted on the mass by the operator and thereby tend to reduce the amount of displacement of the wheels. Thus in the event the lateral acceleration of the vehicle is large enough to cause the vehicle to enter into a skid condition and the operator releases the control rod 14, the mass 26 will cause a corrective steering action which will tend to automatically bring the vehicle out of the skid. In addition, since the mass 26 will tend to oppose the forces exerted by the operator and will be a function of any acceleration of the vehicle, the operator will sense these opposing forces and will have a "feel" of the steering and operating conditions of the vehicle.

What is claimed is:

1. A steering system for an automotive vehicle having a pair of dirigible road wheels effective to determine the direction of travel of said vehicle, said steering system comprising a manually actuated control, servo displacement means interconnected with said control for moving said wheels in response to the displacement of said control, signal generating means whose output is proportional to the speed of the vehicle mounted on said vehicle and operatively connected to said servo displacement means to modify the response thereof in accordance with the speed of the vehicle, a mass mounted on said control and responsive to lateral acceleration of said vehicle and effective to oppose manual forces on said control and bias said control in a direction for displacing said wheels in a direction to reduce the amount of lateral acceleration.

2. A control for a vehicle comprising a member adapted to be mounted in said vehicle for movement in a direction transverse of said vehicle, steering means connected to said member being adapted to control the direction of said vehicle by movement of said member in said transverse direction, the direction of movement of said member corresponding to the direction said vehicle is turning, signal generating means whose output is proportional to the speed of the vehicle mounted on said vehicle and operatively connected to said steering means for modifying the operation of said steering means depending upon the speed of the vehicle, a mass on said member responsive to lateral acceleration of said vehicle and effective to bias said member in a direction to control said vehicle by means of said steering means for reducing said acceleration.

3. The combination of claim 2 wherein said member is also movable in a longitudinal direction for controlling the longitudinal acceleration of said vehicle and said mass is responsive to said acceleration and tends to move said member in a direction to reduce said acceleration.

4. In a control system for an automotive vehicle having steering means, drive means, and braking means, a manual control stick pivoted at one end for rotation about a longitudinal axis and about a transverse axis of said vehicle, steering control means connecting said steering means to said control stick and being responsive to rotation thereof about said longitudinal axis, means responsive to vehicle speed and connected to said steering control means to reduce the steering ratio thereof in an amount corresponding to vehicle speed, speed control means connecting said control stick to said drive means to control the speed thereof in response to rotation of said control stick about said transverse axis in a forward direction, braking control means connecting said control stick to said braking means to control braking action applied thereby in response to rotation of said control stick about said transverse axis in a backward direction, and a mass connected to the free end of said control stick whereby acceleration of said vehicle in any direction will tend to rotate said control stick about its pivot due to the inertia of the mass on the free end and thus provide control action to oppose said acceleration.

References Cited in the file of this patent

UNITED STATES PATENTS

| | | |
|---|---|---|
| 2,176,170 | Flowers | Oct. 17, 1939 |
| 2,226,425 | Epperson | Dec. 24, 1940 |
| 2,748,881 | Holley | June 5, 1956 |
| 2,791,287 | Stolte | May 7, 1957 |
| 2,798,567 | Staude | July 9, 1957 |
| 2,851,795 | Sherman | Sept. 16, 1958 |
| 2,865,462 | Milliken et al. | Dec. 23, 1958 |